United States Patent
Sung et al.

(10) Patent No.: US 6,198,913 B1
(45) Date of Patent: Mar. 6, 2001

(54) AUTOMATIC WAKE-UP DEVICE FOR RADIO AUTOMATIC RECOGNITION TERMINAL AND COMMUNICATION METHOD USING THE TERMINAL

(75) Inventors: Tae-Kyung Sung; Sung-Bin Lim, both of Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/138,515

(22) Filed: Aug. 24, 1998

(30) Foreign Application Priority Data

Aug. 31, 1997  (KR) .................................................. 97-45398

(51) Int. Cl.[7] .............................. H04B 1/16; H04Q 7/00
(52) U.S. Cl. ........................................ 455/343; 340/10.33
(58) Field of Search .................................. 455/343, 574, 455/575, 38.3, 419, 420, 352; 340/825.44, 572.11, 568.7, 572.3, 10.33, 10.34, 10.1; 705/13; 235/384; 342/51, 42

(56) References Cited

U.S. PATENT DOCUMENTS

| | | | |
|---|---|---|---|
| 5,310,999 | * 5/1994 | Claus et al. | .......................... 235/384 |
| 5,581,249 | * 12/1996 | Yoshida | ................................. 235/384 |
| 5,613,213 | * 3/1997 | Naddell et al. | ............................ 455/9 |
| 5,640,156 | * 6/1997 | Okuda et al. | ......................... 235/384 |
| 5,758,278 | * 5/1998 | Lansdowne | ............................ 455/574 |
| 5,790,946 | * 8/1998 | Rotzoll | .................................. 455/343 |
| 5,806,007 | * 9/1998 | Raith et al. | ............................ 455/574 |

* cited by examiner

*Primary Examiner*—Nguyen Vo
(74) *Attorney, Agent, or Firm*—Robert E. Bushnell, Esq.

(57) ABSTRACT

An automatic wake-up device for a radio automatic recognition terminal mounted in a vehicle and a communication method using the terminal are provided in an electronic toll collecting system. The terminal wakes up in response to various modes of automatically waking up the terminal included in the vehicle. The automatic wake-up device includes a circuit responding to a first mode which transmits a wake-up signal having a frequency different from a communication frequency to a wake-up zone when the wake-up zone and communication zone are separately located, and the circuit responds to a second mode which alternately transmits data for communication and data for waking-up the terminal to the communication zone so as to wake up the vehicle terminal without differentiating between the communication zone and the wake-up zone.

13 Claims, 3 Drawing Sheets

AUTOMATIC WAKE-UP DEVICE FOR RADIO AUTOMATIC RECOGNITION TERMINAL AND COMMUNICATION METHOD USING THE TERMINAL

CLAIM OF PRIORITY

This application makes reference to, incorporates the same herein, and claims all benefits accruing 35 U.S.C.§119 from an application entitled AUTOMATIC WAKE-UP DEVICE OF RADIO AUTOMATIC RECOGNITION TERMINAL AND COMMUNICATION METHOD USING THE TERMINAL earlier filed in the Korean Industrial Property Office on Aug. 31, 1997, and there duly assigned Ser. No.97-45398 by that Office.

BACKGROUND OF THE INVENTION

1. Technical Field

The present invention relates to an automatic wake-up device for a radio automatic recognition terminal and a communication method using the terminal. More particularly, the invention relates to an automatic wake-up device for a radio automatic recognition terminal and a communication method using the terminal, in which the radio automatic recognition terminal wakes up in response to various modes of waking up a terminal included in a vehicle in an electronic toll collection system.

2. Related Art

Recently, there has been proposed an electronic toll collection system (ETCS) which reduces the number of men and the time required for collecting tolls on a highway in order to smooth the flow of vehicle traffic.

Typically, an ETCS employs a communication beacon which transmits a radio signal to a communication zone through which a vehicle must pass. The vehicle includes a radio automatic recognition terminal which responds to a polling signal transmitted via the communication beacon as the vehicle passes through the communication zone so that a corresponding toll is automatically collected.

Most vehicle terminals include batteries which operate in a sleep mode at ordinary times, that is, when the vehicle is not near a toll station. The vehicle terminal is awakened when the vehicle approaches the communication beacon and then returns to the sleep mode after communicating with the communication beacon.

Two different wake-up arrangements are utilized in such systems. In a first arrangement, a wake-up beacon is disposed separate from the communication beacon, and the two beacons transmit on different frequencies. Such an arrangement has the disadvantage that, if the vehicle stops at the boundary between the wake-up zone and the communication zone for an extended period of time (such as due to a traffic jam), communication is disabled between the terminal and the beacon, and the vehicle terminal returns to the sleep mode.

A second arrangement does not employ separate beacons, but rather communication data and wake-up data are separately and distinctly encoded and transmitted from the same beacon. However, such an arrangement has the disadvantage that, when vehicles are traveling at high speed and the communication zone is too wide, a large number of vehicle terminals can be in the communication zone at the same time, and this disturbs normal communication.

Therefore, there is a need for the development of an automatic wake-up device for a radio automatic recognition terminal and related communication method that eliminate the problems stated above.

SUMMARY OF THE INVENTION

Accordingly, the present invention is directed to an automatic wake-up device for a radio automatic recognition terminal and a communication method using the terminal that substantially obviate one or more of the problems, limitations and disadvantages set forth above.

An object of the present invention is to provide an automatic wake-up device for a radio automatic recognition terminal and a communication method using the terminal, in which a vehicle terminal in the normal mode can wake up in response to either of the two waking-up methods described herein, and in which a vehicle terminal in the sleep mode can wake up again after passing a wake-up zone.

To accomplish the object of the present invention, there is provided an automatic wake-up device for a radio automatic recognition terminal, comprising: an antenna for picking up a radio signal; a band pass filter for filtering the radio signal picked up by the antenna to obtain a signal having a frequency corresponding to the frequency band of a wake-up signal; a first low pass filter for smoothing the signal which passed the band pass filter so as to generate an average DC level; a first comparator for comparing the signal level obtained by the first low pass filter with a predetermined reference level to determine if it is the wake-up signal, and for generating a corresponding result; a second low pass filter for detecting the DC level of data for waking-up, as amplified by the antenna; a second comparator for comparing the DC level of data for waking-up detected by the second low pass filter with a predetermined reference level to determine if it is the wake-up signal; a CPU for controlling the overall operation of a vehicle terminal, the CPU being normally in a sleep mode; a wake-up controller for waking up the CPU when the first comparator or the second comparator detects the normal wake-up signal; and a power switch which is turned on under the control of the CPU after waking-up of the CPU to provide power to other portions of the vehicle terminal.

To accomplish the objects of the invention, there is also provided a communication method using a radio automatic recognition terminal. In accordance therewith, a communication zone is located in a predetermined area of a lane, and a polling signal is transmitted to the communication zone to process a radio signal related to toll collection when a radio automatic recognition terminal included in a vehicle passing through the communication zone responds to the polling signal. Toll collection is then performed. The method comprises the steps of waiting for a predetermined period of time after the transmission of the polling signal, and then transmitting a radio signal to wake up the terminal for a predetermined period of time when the radio automatic recognition terminal does not respond to the polling signal within the waiting time.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Reference will now be made in detail to the preferred embodiments of the present invention, examples of which are illustrated in the accompanying drawings.

Figure 1:
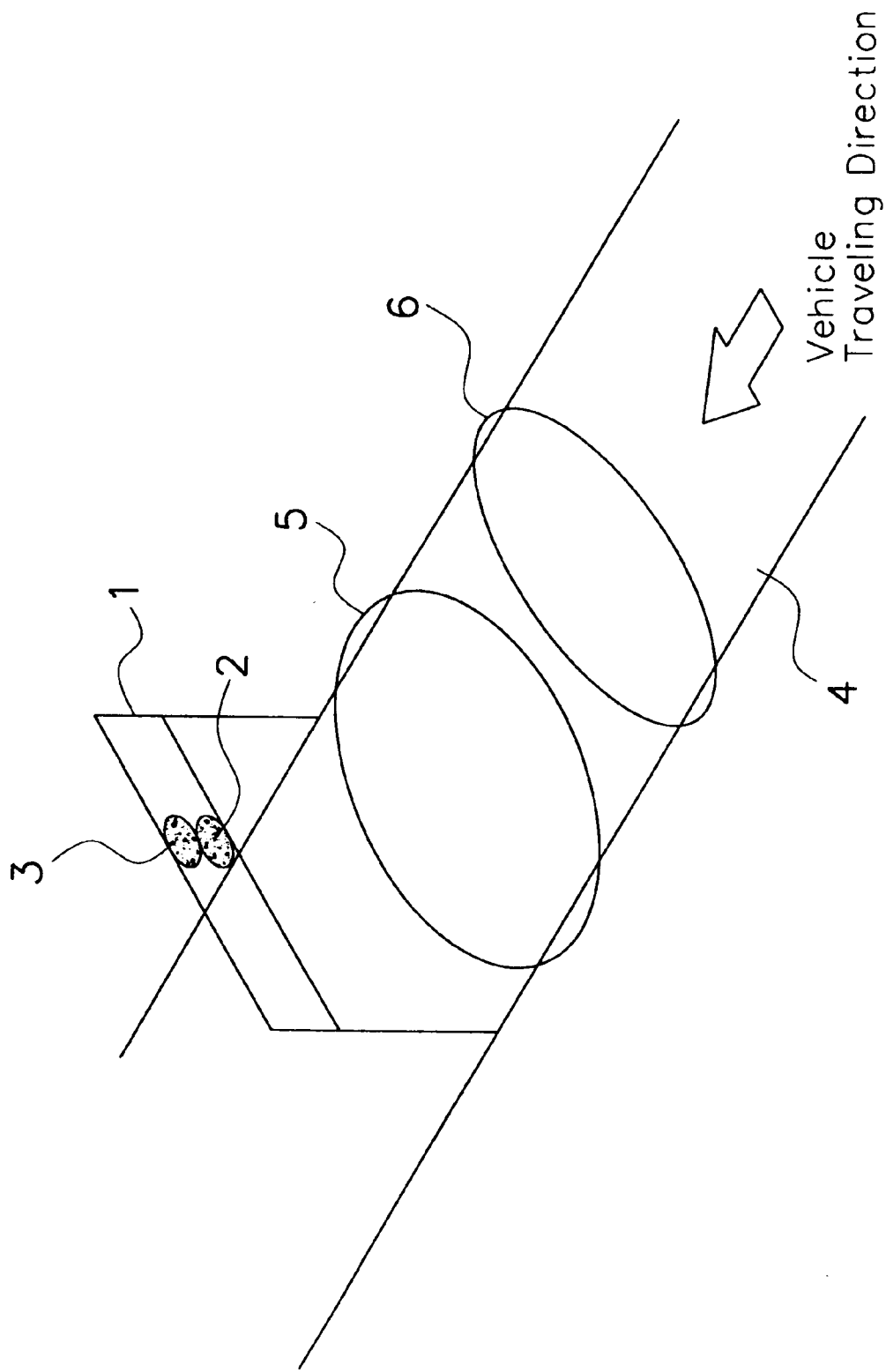
FIG. 1 is a diagram roughly illustrating the configuration of a lane-side device for an ETCS.

FIG. 1 roughly illustrates the configuration of a lane-side device for an ETCS. Referring to FIG. 1, a gantry 1 is placed over a lane 4, and has communication beacon 2 which transmits a radio signal to a specific zone (referred to hereinafter as communication zone 5) of lane 4. A vehicle includes a radio automatic recognition terminal (referred to hereinafter as a vehicle terminal) which radio-communicates with communication beacon 2. With communication beacon 2 transmitting a polling signal to communication zone 5 in a predetermined cycle, the vehicle responds to this polling signal when it passes through communication zone 5 so that a corresponding toll is automatically collected.

Communication beacon 2 is directed only toward a predetermined point. Thus, vehicle terminals which include batteries operate in the sleep mode at ordinary times, but wake when they are close to communication beacon 2, and then return to the sleep mode after communicating with communication beacon 2, thereby reducing consumption of battery power. A wake-up beacon 3 is disposed on gantry 1 separate from communication beacon 2 to transmit a wake-up signal, having a frequency different from that of the communication signal, to a wake-up zone 6 in front of communication zone 5, thereby waking up the vehicle terminal before it reaches communication zone 5. With this wake-up method, however, the vehicle terminal returns to the sleep mode when the vehicle stops at the boundary between the wake-up zone and communication zone for an extended period of time (e.g., due to traffic jam), thereby disabling communication between the vehicle terminal and the communication beacon. Furthermore, communication is not possible when the transmission antenna of the wake-up beacon is out of order.

There is another method of waking up a vehicle terminal without using a separate wake-up beacon and establishing a wake-up zone. Under that method, data for communication and data for waking-up are encoded differently and are transmitted from the same communication beacon to the communication zone. With a system such as the ETCS performing radio communication with vehicles traveling at high speed, when the communication zone is too wide, there are a lot of vehicle terminals in the communication zone, and this disturbs normal communication. To prevent this, the communication zone is limited to approximately five square meters. This reduces the time, exclusive of time for waking up, required to carry out communication for toll collection. In terms of the vehicle terminal, a wake-up device which responds to only one of the above two methods does not wake up in a system employing the other method, being disabled in communication.

Figure 2:
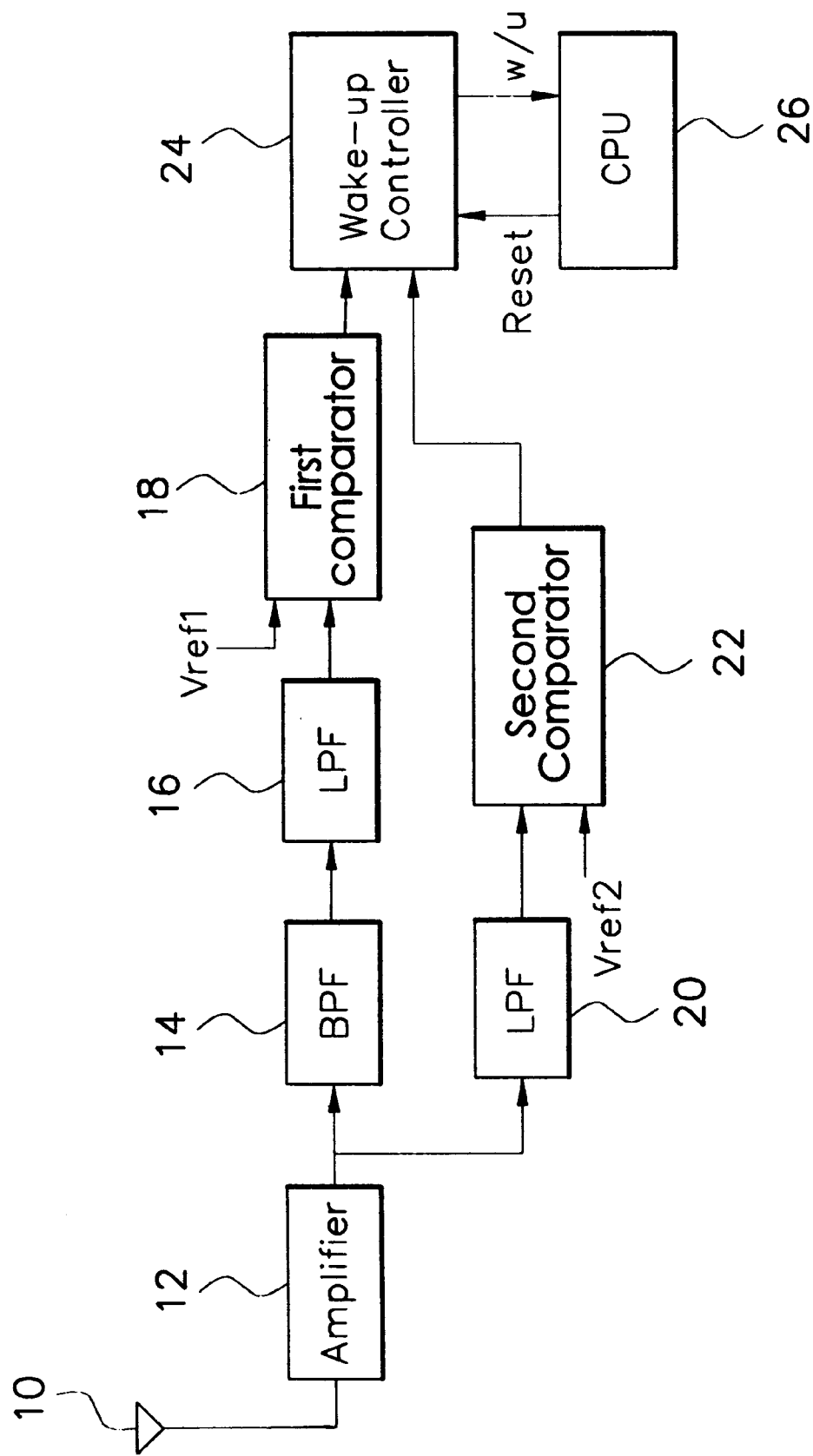
FIG. 2 is a block diagram of an automatic wake-up device for a radio automatic recognition terminal according to the present invention.

FIG. 2 is a block diagram of an automatic wake-up device for a radio automatic recognition terminal according to the present invention. Referring to FIG. 2, the automatic wake-up device for a radio automatic recognition terminal according to the present invention includes a circuit responsive to a mode (referred to hereinafter as the first mode) which transmits a wake-up signal, with a frequency different from a communication frequency, to a wake-up zone when the wake-up zone and communication zone are separately located, and a circuit responsive to another mode (referred to hereinafter as the second mode) which alternately transmits data for communication and data for waking-up to the communication zone to wake up the vehicle terminal without differentiating the communication zone and the wake-up zone from each other.

The circuit responsive to the first mode includes: an antenna 10 for picking up a radio signal; an amplifier 12 for amplifying the radio signal to a level where the signal can be processed; a band pass filter 14 for filtering the radio signal amplified by amplifier 12 to obtain a signal having a frequency corresponding to the frequency band of the wake-up signal; a low pass filter 16 for smoothing the signal which has passed band pass filter 14 to generate an average direct current (DC) level; a first comparator 18 for comparing the average DC level of the signal from filter 16 with a predetermined reference level (Vref1) to determine if the signal is a wake-up signal, and for generating a corresponding result; a CPU 26, which stands by in sleep mode at ordinary times, and which controls the overall operation of the vehicle terminal; a wake-up controller 24 for waking up CPU 26 when first comparator 18 detects the normal wake-up signal; and a power switch (not shown) which is turned on under the control of CPU 26 after the CPU 26 wakes up to provide power to other portions of the vehicle terminal. The circuit responding to the second mode includes: a low pass filter 20 for filtering the signal picked up by antenna 10 and amplified by amplifier 12 to detect the DC level of data for waking-up; a second comparator 22 for comparing the DC level of the data for waking-up detected by low pass filter 20 with a predetermined reference level (Vref2) to determine if it is the wake-up signal; wake-up controller 24; CPU 26; and a power switch (not shown).

Figure 3:
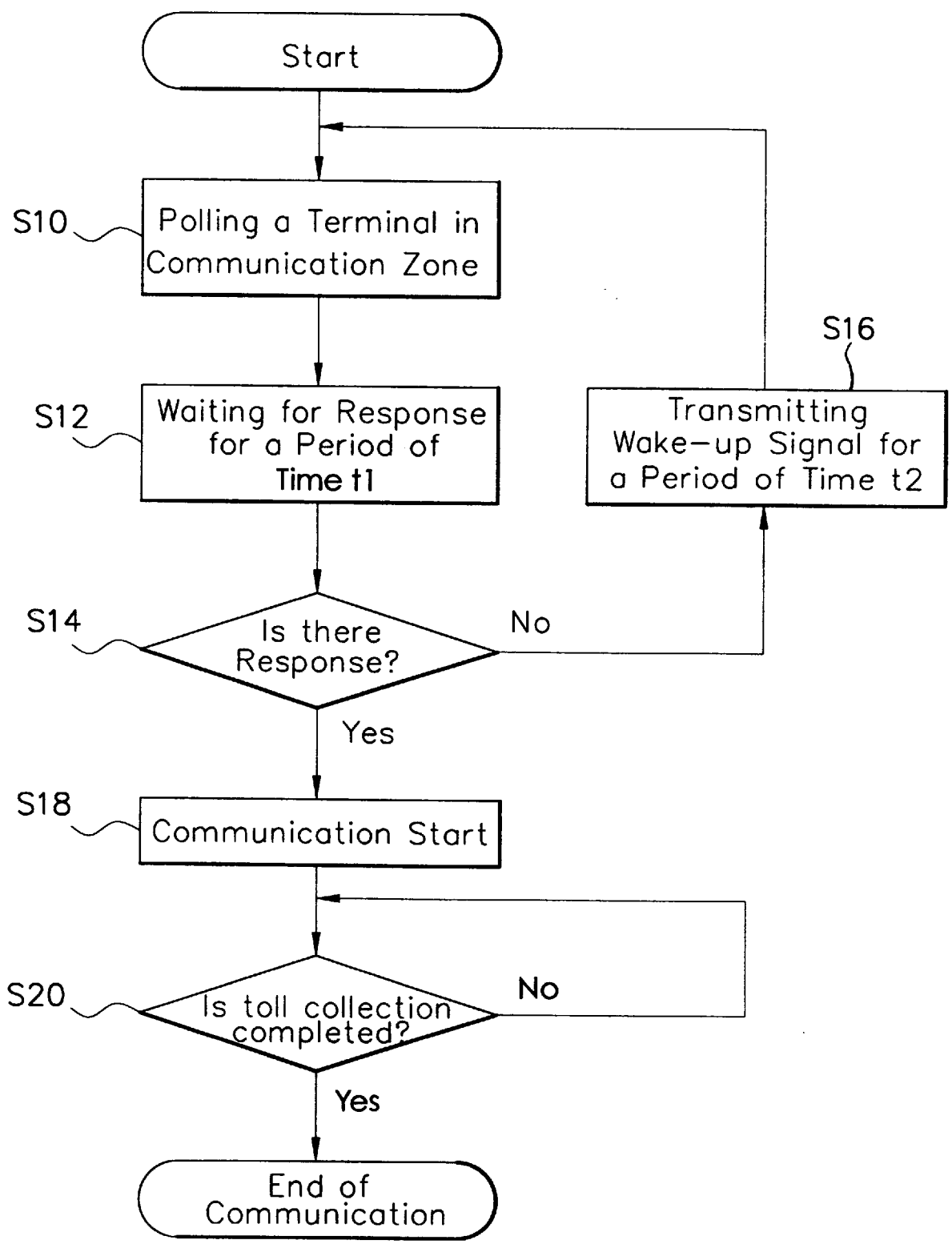
FIG. 3 is a flow diagram showing a communication method using the radio automatic recognition terminal according to the present invention.

The operation of the automatic wake-up device of the radio automatic recognition terminal and the communication method using the terminal according to the present invention will now be explained. FIG. 3 is a flow diagram showing a communication method using the radio automatic recognition terminal according to the present invention. In the first mode, in which a wake-up signal having a wake-up frequency different from the communication frequency is transmitted to wake up the vehicle terminal, wake-up beacon 3 continuously transmits a wake-up signal coded to have a specific duty ratio to wake-up zone 6. When a vehicle arrives in wake-up zone 6, antenna 10 of its terminal picks up the wake-up signal transmitted from wake-up beacon 3. This signal is then amplified to a predetermined level by amplifier 12. The amplified signal includes communication signals and noise, as well as the wake-up signal. Band pass filter 14 filters the amplified signal to obtain a signal corresponding to the frequency component of the wake-up signal. Thereafter, low pass filter 16 integrates the wake-up signal to generate the average DC level which is compared with the predetermined reference level (Vref1) by first comparator 18 in order to determine if it is the wake-up signal. When it is, wake-up controller 24 controls CPU 26, which has been standing by in sleep mode, and the power switch (not shown) to provide power to the communication circuit and display circuit of the vehicle terminal, allowing communication to be performed in communication zone 5.

In the case of the second mode, the vehicle terminal wakes up only when the vehicle reaches communication zone 5. With the first mode, when the vehicle stops at the boundary between wake-up zone 6 and communication zone 5 for a long period of time, the vehicle terminal may return to the sleep mode. Even in this case, the vehicle terminal can wake up if the vehicle arrives in communication zone 5. This is described below in more detail with reference to FIG. 3.

Communication beacon 2 polls the vehicle in communication zone 5 at step S10, waits for response from the vehicle terminal for a predetermined period of time t1 at step S12, and then determines whether there is a response from the terminal at step S14. The vehicle terminal cannot respond to the communication beacon at step S14 if it does not wake up. In this case, communication beacon 2 transmits data for waking-up to communication zone 5 for a predetermined period of time t2 to wake up the vehicle terminal in step S16, and then returns to step S10. When the vehicle terminal is already in the wake-up state so that it can respond at step S14, communication is performed through steps S18 and S20 to collect the toll.

It will be apparent to those skilled in the art that various modifications and variations can be made in the automatic wake-up device of a radio automatic recognition terminal and communication method using the terminal of the present invention without departing from the spirit or scope of the invention. For example, the device of the present invention can be used in a system for providing traffic information as well as ETCS.

According to the present invention, the vehicle terminal in sleep mode can wake up in response to various wake-up methods. Furthermore, it is possible to wake up the vehicle terminal which returns to the sleep mode after passing the wake-up zone.

What is claimed is:

1. An automatic wake-up device for a radio automatic recognition terminal, comprising:
   an antenna for picking up a radio signal;
   a band pass filter for filtering a signal having a frequency corresponding to a frequency band of a wake-up signal from the radio signal picked up by the antenna and producing a band pass output signal;
   a first low pass filter for smoothing the band pass output signal to obtain a signal level corresponding to an average direct current(DC) level signal;
   a first comparator for comparing the signal level obtained by the first low pass filter with a predetermined reference level to determine whether it is the wake-up signal, and for generating a corresponding result;
   a second low pass filter for detecting the DC level of data for waking-up from the radio signal picked up by the antenna;
   a second comparator for comparing the DC level of data for waking-up detected by the second low pass filter with a predetermined reference level to determine whether it is the wake-up signal;
   a central processing unit (CPU) for controlling overall operation of the radio automatic recognition terminal, said CPU being normally in a sleep mode;
   a wake-up controller for waking up the CPU when one of the first comparator and the second comparator detects the wake-up signal; and
   a power switch which is turned on under the control of the CPU after waking up of the CPU to provide power to other portions of the radio automatic recognition terminal.

2. The device of claim 1, further comprising an amplifier connected between said antenna and said band pass filter for amplifying the radio signal picked up by said antenna prior to provision to said band pass filter.

3. An automatic wake-up device for a radio automatic recognition terminal, comprising:
   antenna means for picking up a radio signal;
   first circuit means for receiving and processing said radio signal picked up by said antenna means, and for differentiating between a wake-up signal having a first frequency and a communication signal having a second frequency so as to generate a first output signal indicating receipt of the wake-up signal;
   second circuit means for receiving and processing said radio signal picked up by said antenna means so as to differentiate between data for waking up the terminal and data for communication alternately transmitted, and generating a second output signal indicating receipt of said data for waking up the terminal; and
   wake-up means for converting the terminal from a sleep mode to an awake mode in response to reception of one of said first output signal and said second output signal from said first circuit means and said second circuit means, respectively.

4. The device of claim 3, wherein said first circuit means comprises a filter arrangement for receiving and filtering the radio signal picked up by said antenna means so as to obtain a signal level, and a comparator comparing the signal level obtained by the filter arrangement with a predetermined reference level to detect the reception of the wake-up signal.

5. The device of claim 4, wherein said filter arrangement comprises a band pass filter for filtering the radio signal picked up by said antenna means so as to obtain a signal having a frequency corresponding to a frequency band of the wake-up signal and to produce a band pass output signal, and a low pass filter for smoothing the band pass output signal to obtain a signal level corresponding to an average direct current level signal.

6. The device of claim 3, wherein said second circuit means comprises a filter arrangement for filtering the radio signal picked up by said antenna means to detect a signal level of the data for waking up said terminal, and a second comparator for comparing the signal level detected by said law pass filter with a predetermined reference level to detect the wake-up signal.

7. The device of claim 3, wherein said wake-up means comprises a central processing unit for controlling overall operation of the terminal, said central processing unit being normally in a sleep mode, and a wake-up controller for waking up the central processing unit when one of the first circuit means and the second circuit means detects the wake-up signal.

8. The device of claim 3, further comprising amplifier means connected between said antenna means, on the one hand, and said first and second circuit means, on the other hand, for amplifying the radio signal picked up by said antenna means prior to provision to said first and second circuit means.

9. A communication method using a radio automatic recognition terminal mounted in a vehicle, wherein a communication zone is located in a predetermined area of a lane through which the vehicle passes, said method comprising the steps of:
   transmitting a polling signal to the communication zone;
   waiting for a predetermined period of time after the transmission of the polling signal;
   determining whether there is a response to the polling signal by the terminal mounted in the vehicle; and when there is no response to the polling signal from the terminal mounted in the vehicle, transmitting a radio signal to wake up the terminal mounted in the vehicle for a predetermined period of time;

said method further comprising the steps of operating said radio automatic recognition terminal in a first mode of operation wherein the radio automatic recognition terminal distinguishes between a first frequency of a wake-up signal and a second frequency of a communication data signal, and operating said radio automatic recognition terminal in a second mode of operation wherein the radio automatic recognition terminal does not distinguish between frequencies of the wake-up signal and the communication data signal.

10. The method of claim 9, further comprising the step, when there is a response to the polling signal from the terminal mounted in the vehicle, of starting communication.

11. The method of claim 10, further comprising the steps, after the start of communication, of:

determining whether toll collection is completed; and when toll collection is completed, ending the communication with the vehicle.

12. A communication method for use with a toll collection system, comprising the step of:

providing a radio automatic recognition terminal in a vehicle passing through the toll collection system;

providing the radio automatic recognition terminal with a capability of operating in first and second modes of operation;

in the first mode of operation, transmitting a wake-up signal having a first frequency different from a second frequency of a communication signal to a wake-up zone of the toll collection system when the wake-up zone and a communication zone of the toll collection system are separately located;

in the second mode of operation, transmitting the wake-up signal and the communication signal alternately without distinguishing the wake-up zone and the communication zone from each other;

operating said radio automatic recognition terminal in said first mode of operation so as to respond to the wake-up signal and the communication signal when the wake-up signal is transmitted in said first mode of operation;

operating said radio automatic recognition terminal in said second mode of operation when the wake-up signal and the communication signal are transmitted in said second mode of operation.

13. The method of claim 12, wherein said step of operating said radio automatic recognition terminal in said first mode of operation comprises filtering a received signal so as to distinguish between the wake-up signal and the communication signal.

* * * * *